March 18, 1969
P. U. PUTSCH ET AL  3,432,881
HINGE FITTING FOR ADJUSTABLY CONNECTING A SEAT AND A BACKREST
TO EACH OTHER, ESPECIALLY FOR MOTOR VEHICLES
Filed June 12, 1967
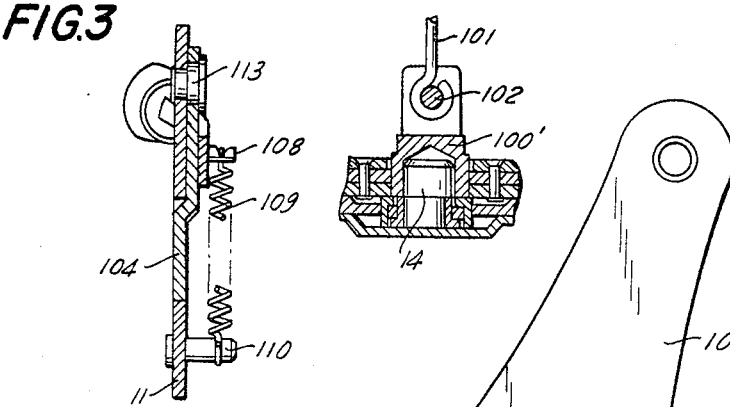
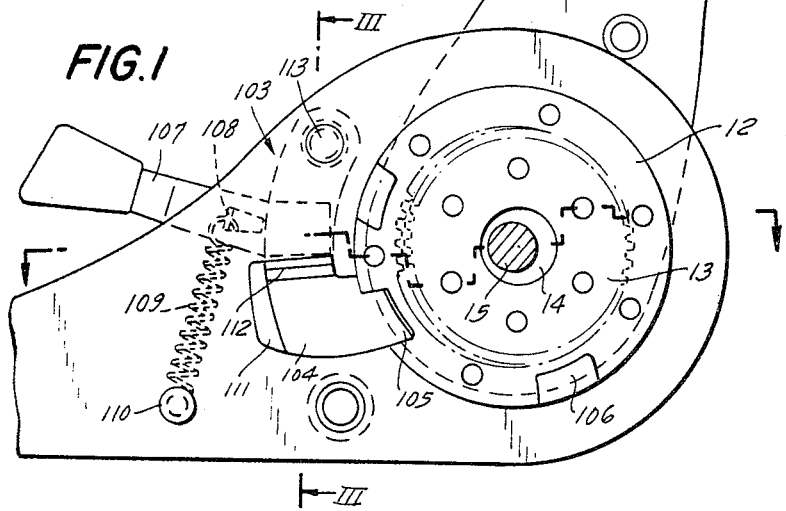
INVENTORS United States Patent Office 3,432,881
Patented Mar. 18, 1969

3,432,881
HINGE FITTING FOR ADJUSTABLY CONNECTING A SEAT AND A BACKREST TO EACH OTHER, ESPECIALLY FOR MOTOR VEHICLES
Peter Ulrich Putsch, Moltkestrasse 14, Remscheid-Hasten, Germany, and Paul Werner, Herder Strasse 16, and Gustav Adolf Reinmoller, Max-Strasse 29, both of Remscheid, Germany
Filed June 12, 1967, Ser. No. 645,297
Claims priority, application Germany, June 11, 1966, P 39,680
U.S. Cl. 16—146　　　　　　　　　　　　　　9 Claims
Int. Cl. E05d *11/10;* B60m *1/02*

ABSTRACT OF THE DISCLOSURE

A hinge fitting for adjustably connecting a seat and a backrest, especially for motor vehicles, in which a pair of hinge members pivotally connected to each other are respectively fixedly connected to the seat and to the backrest, in which means cooperate with the hinge members for gradually adjusting the position of the hinge members and the elements fixed thereto relative to each other, and in which locking means movable between a locking and a releasing position cooperate with the aforementioned means to permit in the locking position of the locking means only gradual adjustment of the position of the link members relative to each other, and in the releasing position free tilting of the link member fixed to the back rest relative to the other link member.

Background of the invention

The present invention relates to a hinge fitting for adjustably connecting a seat and a backrest, especially of a motor vehicle, in which a first link member is fixedly connected to the seat, whereas a second link member tiltably connected at one end to the first link member is fixedly connected to the backrest, and in which adjusting means are provided for adjusting the position of the two link members relative to each other so as to adjust the position of the backrest relative to the seat. Various constructions of this type are known in the art and in one of the known constructions there is provided a means for gradually adjusting the position of the two link members relative to each other, which means include a gear ring having radially inwardly directed teeth and being coordinated with the fixed link member and a spur gear coordinated with the tiltable link member and having teeth engaging the teeth of the gear ring, whereby the outer diameter of the spur gear is smaller than the root diameter of the gear ring at least by a distance equal to the height of one tooth, and in which the tiltable link member is mounted on an eccentric tiltably mounted on the pivot means pivotally connecting the link members to each other, which eccentric is turnable by means of a handle connected thereto. The eccentricity of the eccentric corresponds substantially to the difference between the root diameter of the gear ring and the outer diameter of the spur gear, and this difference is chosen in such a manner so as to assure self-locking between the gear ring and the spur gear in any adjusted position. This known hinge fitting has the advantage to require very little space, which is especially of importance if the hinge fitting is used in a seat for motor vehicles. A further advantage of this known construction is also that the backrest can be tilted relative to the seat by simply turning the handle connected to the eccentric, whereby the self-locking between the gears will assure that the backrest will remain in any adjusted position.

On the other hand, this known arrangement has the disadvantage that a free tilting of the backrest relative to the seat is not possible, as is often desirable especially in two-door sedans in which the backrest of the front seats have to be tilted forwardly in order to facilitate entrance of a passenger to the rear seats of the vehicle. In the known construction any tilting of the backrest through a relatively large angle will require repeated operation of the handle, which evidently precludes a quick tilting movement of the backrest relative to the seat.

It is an object of the present invention to overcome the abovementioned disadvantage of a hinge-fitting of the aforementioned type.

It is a further object of the present invention to provide for a hinge fitting which has all the advantages of the hinge fitting abovedescribed without having the aforementioned disadvantages thereof.

It is an additional object of the present invention to provide for a hinge fitting of the aforementioned kind which permits a fine adjustment of the backrest relative to the seat as well as a fast tilting of the backrest relative to the seat with a relatively simple construction so that the hinge fitting may be manufactured at reasonable cost and will stand up properly under extended use.

Summary of the invention

With these and other objects in view, the hinge fitting for adjustably connecting a seat and a backrest, especially for motor vehicles, mainly comprises according to the present invention a first hinge member adapted to be fixedly connected to the seat, a second hinge member adapted to be fixedly connected to the backrest, pivot means pivotally connecting the hinge members, a spur gear fixedly connected to the second hinge member, a ring gear surrounding the spur gear turnably mounted in the first link member and having inwardly directed teeth meshing only with part of the teeth of the spur gear in which the outer diameter of the spur gear is smaller at least for a distance equal to the length of a tooth than the root diameter of the ring gear, eccentric means turnably carried by the pivot means and having an eccentricity substantially equal to the difference between the aforementioned diameter such that self-locking of the gears is assured, and turning means connected to the eccentric means for turning the same. The hinge fitting further comprises locking means cooperating with the gear ring and being movable from a locking position engaging the gear ring for preventing turning thereof relative to the first link member so that the position of the link member relative to each other can be adjusted only by turning the turning means and a releasing position disengaged from the ring gear so that the latter and the second link member may be freely turned without operating the turning means. When the locking means is brought to the releasing position the backrest can be quickly turned into the desired position and fixed therein by moving the locking means back to its locking position.

In a preferred arrangement the ring gear is formed with at least one cutout and the locking means comprises a projection engaging in the cutout when the locking means is in the locking position thereof.

Preferably the locking means is in form of a lever mounted tiltable about the tilting axis and carrying the aforementioned projection spaced from the tilting axis. The aforementioned lever may be tiltably mounted on a pivot pin projecting from the first link member. Preferably the arrangement includes also biasing means cooperating with the locking means and constructed so as to yieldably maintain the locking means in the locking position. The biasing means are preferably in the form of a coiled tension spring connected at one end thereof to a flap bent out from the locking lever, whereas the other end of the tension spring is fixed to a pin projecting transversely from the first link member.

An advantageous construction is derived when the locking means or the locking lever comprises a pair of substantially parallel end portions connected by a connecting portion extending transverse to the end portions and in which the first link member is formed with an opening through which the connecting portion of the locking means or locking lever extends, and the opening is preferably arranged in such a manner that two opposite faces which partly define the opening serve to guide the locking member during its movement between the positions thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

Brief description of the drawing

FIG. 1 is a side view of the hinge fitting according to the present invention with some of the elements of the hinge fitting removed;

FIG. 2 is a cross section taken along the line II—II of FIG. 1;

FIG. 3 is a cross section taken along the line III—III of FIG. 1; and

FIG. 4 is a partial cross section similar to FIG. 2 and showing a slightly modified arrangement.

Description of the preferred embodiments

Referring now to the drawings, and more specifically to FIGS. 1–3 of the same, it will be seen that the hinge fitting according to the present invention for adjustably connecting a seat and backrest, especially for motor vehicles, mainly comprises a tiltable hinge member 10 adapted to be connected to the backrest, and a fixed hinge member 11 articulately connected to the tiltable hinge member 10 and adapted to be fixedly connected to the seat. It is mentioned that the various figures of the drawing show only the parts of the hinge fitting according to the present invention necessary for the proper understanding of the invention and the backrest and the seat itself as well as the means for attaching the backrest and the seat to the tiltable link member 10 and to the fixed link member 11 are not illustrated in the drawings.

The hinge fitting further comprises a ring gear 12 having radially inwardly directed teeth and a spur gear 13. As shown in FIG. 1, only part of the teeth of the ring gear 12 are in meshing engagement with the teeth of the spur gear 13, and the respective portion of the gear teeth which are in meshing engagement with each other will depend on the position of the backrest with respect to the seat, respectively the position of the tiltable hinge member 10 with respect to the fixed hinge member 11. The number of teeth on the gearing 12 differ from that on the spur gear 13 by at least one tooth. Furthermore, the outer diameter of the spur gear 13 is smaller at least for a distance equal to the length of one tooth than the root diameter of the ring gear 12.

The spur gear 13 is fixedly connected, for instance by rivets 71 to the tiltable hinge member 10, whereby a distance disc 36 is sandwiched between the tiltable hinge member and the spur gear 13 through which the rivets 71 pass, as clearly shown in FIG. 2. The ring gear 12 is sandwiched between the discs 42 and 114 and connected to these discs by rivets 70. The axial thickness of the ring gear 12 is substantially equal to that of the fixed hinge member 11, and the gear ring 12 is arranged substantially in one plane with the fixed hinge member.

The disc 36 and the spur gear 13 are fixedly connected in any convenient manner with a bolt 100 coaxially arranged with the axis of the spur gear. A connecting element, for instance a tube, not shown in the drawing and leading to the other side of the seat may be fixedly connected to the portion of the bolt 100 projecting beyond the tiltable hinge member 10. At its outer end, the bolt 100 is formed with a central cavity 100a into which an eccentric 14 engages. The eccentric portion 15 of the eccentric projects beyond the cavity and has at its outer end a portion 17 of reduced diameter. A disc 41 is fixedly connected to the portion 17 of the eccentric, and a turning means in form of a handle is fixedly connected in any convenient manner to the disc 41. The handle is provided at its outer side with a cap 29 fitted into a cavity of the handle 16.

The disc 42 is elastically mounted on the portion 15 of the eccentric. For this purpose two bearing sleeve halves 38 and 39 are provided which together enclose an annular member 40 of elastic material. The elastic annular member 40 serves mainly to compensate for any manufacturing tolerances, which is advantageous for the assembly of the aforementioned components.

The aforementioned described elements serve in a manner as will be described later on in detail for gradually adjusting the position of the tiltable hinge member 10 and the backrest connected thereto with respect to the fixed hinge member 11 which is connected to the seat, and such gradual adjustment may be carried out by turning the handle 16.

According to the present invention, the hinge fitting is also provided with means which permit, when desired, also a quick tilting of the tiltable hinge member 10 with respect to the fixed hinge member 11 without turning the handle 16. As shown in FIG. 1, the ring gear 12 is turnably mounted in a corresponding circular opening of the fixed hinge member 11, however, in the position shown in FIG. 1, the gear ring 12 is prevented from turning by the projection 105 of the locking means 103 which engages in one of the cutouts 106 formed in the outer periphery of the gear ring 12. In the position shown in FIG. 1 the projection 105 engages in that cutout 106 which corresponds to the normal position of the hinge members 10 and 11 to each other, that is the position these members will assume when the seat is occupied by a driver.

The locking means 103 comprise, in the construction illustrated in the drawing, lever means formed by two members fixedly connected to each other in any convenient manner, that is a locking member 104 and a lever 107 laterally projecting therefrom. The projection 105 is integrally formed with the locking member 104. As best shown in FIG. 3, the locking member 104 comprises two portions offset with respect to each other and connected to each other by a transverse portion 112. Part of the locking member 104 is located at the rear of the fixed hinge member 11, whereas the part extending downwardly from the transverse portion 12 is located in a cutout 111 of the fixed hinge member 11. The locking means 103 is pivotally mounted on the fixed hinge member 11 by means of a pivot pin 13 fixed to and projecting rearwardly from the hinge member 11.

A tension spring 109 is connected at one end thereof to a flap 108 stamped and bent out of the plane of the lever 107, whereas the other end of the spring 109 is connected to a pin 110 fixed to and projecting rearwardly from the fixed hinge member 11. The tension spring 109 constitutes biasing means biased in such a manner so as to tend to yieldably maintain the locking means 103 in the locking position, that is the spring 109 will tend to keep the projection 105 of the locking member engaged in a cutout 106 of the ring gear 12.

As will be evident from the above description of the hinge fitting, the position of the tiltable hinge member 10 may be gradually adjusted with respect to the fixed hinge member 11 by turning the handle 16 while maintaining the locking means 103 in the locking position as shown in FIG. 1, with the projection 105 engaged into one of the cavities 106 of the ring gear 12, while by moving the locking means 103 from the position shown in FIG. 1 to a releasing position in which the projection 105 is moved out of the respective cavity 106, the tiltable hinge member 10 and the backrest, not shown in the drawing, connected thereto may be quickly tilted with respect to the fixed hinge member 11 and the seat connected thereto without operating the handle 16. The opening 111 in the fixed hinge member is preferably formed in such a manner that the bottom face of the locking member 104 is guided on a corresponding face of the opening during the movement of the locking means 103 between the locking and the releasing position thereof.

The modification only partly shown in FIG. 4 differs from the abovedescribed embodiment illustrated in FIGS. 1–3 only in that the bolt 100' in which the eccentric 14 is mounted is formed at its inner end thereof with a bore transverse to its axis into which a pin 102 is press fitted which receives the eye of a torsion rod 101 which leads to a fixed bearing of the backrest on the opposite side of the seat.

It will be understood that each of the elements described above, or two or more together, may also find a useful application in other types of hinge fittings differing from the types described above.

While the invention has been illustrated and described as embodied in a hinge fitting provided with releasable locking means permitting when engaged only gradual adjustment and when released quick adjustment of the hinge members relative to each other, it is not intended to be limited to the details shown, since various modifications and structural changes may be made without departing in any way from the spirit of the present invention.

We claim:

1. A hinge fitting for adjustably connecting a seat and a backrest, especially for motor vehicles, comprising, in combination, a first hinge member adapted to be fixedly connected to the seat, a second hinge member adapted to be fixedly connected to the backrest; pivot means pivotally connecting said hinge members; a spur gear fixedly connected to said second hinge member; a ring gear surrounding the spur gear and turnably mounted on said first hinge member, said ring gear having inwardly directed teeth meshing only with part of the teeth of said spur gear, the outer diameter of said spur gear being smaller at least for a distance equal to the length of a tooth than the root diameter of said ring gear; eccentric means turnably carried by said pivot means and having an eccentricity substantially equal to the difference between said diameters such that self-locking of said gears is assured; turning means connected to said eccentric for turning the same; and locking means cooperating with said ring gear and being movable from a locking position engaging said ring gear for preventing turning thereof relative to said first hinge member so that the position of said hinge members relative to each other can be adjusted only by turning said turning means, and a releasing position disengaged from said ring gear so that said second hinge member may be freely tilted with respect to said first link member without operating said turning means.

2. A hinge fitting as defined in claim 1, wherein said ring gear is formed with at least one cutout, and wherein said locking means comprises a projection engaging in said cutout when said locking means is in said locking position.

3. A hinge fitting as defined in claim 2, wherein said locking means is in form of lever means mounted tiltably about a tilting axis and carrying said projection spaced from said tilting axis.

4. A hinge fitting as defined in claim 3 and including a pivot pin projecting from said first hinge member and tiltably carrying said lever means.

5. A hinge fitting as defined in claim 1, and including biasing means cooperating with said locking means and constructed so as to yieldably maintain said locking means in said locking position.

6. A hinge fitting as defined in claim 3, and including spring means cooperating with said lever means to yieldably maintain the latter in said locking position.

7. A hinge fitting as defined in claim 6, wherein said spring means comprises a coiled tension spring connected to a flap bent out from said lever and including a pin fixed to and projecting transversely from said first hinge member to which the other end of said coil spring is connected.

8. A hinge fitting as defined in claim 1, wherein said locking means comprises an elongated member having a pair of substantially parallel end portions connected by a connecting portion extending transverse to said end portions, and wherein said first hinge member is formed with an opening through which said connecting portion of said elongated member extends.

9. A hinge fitting as defined in claim 8, wherein said opening and said elongated member forming said locking means are constructed and arranged with respect to each other so that faces which partly define said opening serve to guide said locking member during movement between said positions thereof.

References Cited

UNITED STATES PATENTS

| | | | |
|---|---|---|---|
| 1,564,435 | 12/1925 | May | 74—530 |
| 2,784,770 | 3/1957 | Horr | 297—367 |
| 3,299,466 | 1/1967 | Werner | 297—366 |

BOBBY R. GAY, *Primary Examiner.*

DORIS L. TROUTMAN, *Assistant Examiner.*

U.S. Cl. X.R.

297—366